(12) United States Patent
Chung et al.

(10) Patent No.: US 11,307,640 B2
(45) Date of Patent: Apr. 19, 2022

(54) METHOD AND APPARATUS FOR MANAGING USAGE TIME OF IOT DEVICES

(71) Applicant: Dialog Semiconductor Korea Inc., Seongnam-si (KR)

(72) Inventors: Sang Hak Chung, Seongnam-si (KR); Jin Woo Park, Seongnam-si (KR); Seung Ho Shin, Seongnam-si (KR); Sung Ho Kim, Seongnam-si (KR)

(73) Assignee: Dialog Semiconductor Korea Inc., Seoul (KR)

( * ) Notice: Subject to any disclaimer, the term of this patent is extended or adjusted under 35 U.S.C. 154(b) by 225 days.

(21) Appl. No.: 16/702,562

(22) Filed: Dec. 4, 2019

(65) Prior Publication Data
US 2020/0310525 A1 Oct. 1, 2020

(30) Foreign Application Priority Data
Mar. 25, 2019 (KR) .......... 10-2019-0033578

(51) Int. Cl.
*G06F 1/3287* (2019.01)
*G06F 1/3206* (2019.01)
*G06F 1/3296* (2019.01)

(52) U.S. Cl.
CPC .......... *G06F 1/3287* (2013.01); *G06F 1/3206* (2013.01); *G06F 1/3296* (2013.01)

(58) Field of Classification Search
CPC .... G06F 1/3287; G06F 1/3206; G06F 1/3296; G06F 1/3228
See application file for complete search history.

(56) References Cited

U.S. PATENT DOCUMENTS

| 2009/0172117 | A1* | 7/2009 | Bedi | H04W 52/0229 |
| | | | | 709/206 |
| 2016/0302147 | A1* | 10/2016 | Lee | H04W 52/0229 |
| 2017/0118089 | A1* | 4/2017 | Hur | H04W 52/02 |
| 2017/0353981 | A1* | 12/2017 | Lee | H04W 12/08 |
| 2019/0064915 | A1* | 2/2019 | Leucht-Roth | G06F 1/3278 |
| 2019/0196566 | A1* | 6/2019 | Fok | H04W 76/28 |
| 2020/0084720 | A1* | 3/2020 | Marin | H04W 72/0446 |

FOREIGN PATENT DOCUMENTS

| KR | 10-2017-0046993 | 5/2017 |
| WO | 2017/069466 | 4/2017 |

OTHER PUBLICATIONS

Korean Office Action, Application No. 10-2019-0033578, Applicant: Dialog Semiconductor Korea Inc., Transmittal dated Nov. 12, 2109.

\* cited by examiner

*Primary Examiner* — Vincent H Tran
(74) *Attorney, Agent, or Firm* — Saile Ackerman LLC; Stephen B. Ackerman

(57) ABSTRACT

Provided are a method for managing usage time of an IoT device, and an apparatus therefor. According to the disclosure, a method for managing usage time of an IoT device which flexibly controls a standby mode of an IoT device according to a user's selection, and which enables a user to select an operation method of a standby mode by using an application for minimizing power consumption of an IoT device, and an apparatus therefor are provided.

7 Claims, 8 Drawing Sheets

METHOD AND APPARATUS FOR MANAGING USAGE TIME OF IOT DEVICES

RELATED APPLICATION

This application claims the benefit of priority of Korean Patent Application No. 10-2019-0033578 filed on Mar. 25, 2019, the contents of which are incorporated herein by reference in their entirety.

FIELD AND BACKGROUND OF THE INVENTION

The disclosure relates to a method for managing usage time of internet of things (IoT) devices, and an apparatus therefor.

The content described in this section merely provides background information for the disclosure, and does not constitute a conventional technology.

With the development of information communication technologies, a ubiquitous society is coming into reality. A ubiquitous society is developing very fast as it is spurred by development of internet of things (IoT) technologies, and accordingly, users became capable of using various services through IoT devices connected to the Internet.

An IoT device operates a receiving mode to receive a beacon signal from a router connected to the Internet. Meanwhile, for a period that operates in a receiving mode, there is need to increase battery usage time by reducing power consumption. However, for an IoT device, the properties of a period operating in a receiving mode cannot be changed easily in general. To be more specific, due to the limitation that a Wi-Fi chip has, there is a disadvantage that only a receiving mode of a fixed type is operated. This influences battery usage time, which is a main standard for determining performance of an IoT device using a battery. Meanwhile, there is also a problem that, although an IoT device has a function of setting a standby mode on a user application, the device is not capable of providing a function of a selective standby mode, such as dividing a busy period and an idle period.

SUMMARY OF INVENTION

The disclosure is aimed at providing a method for managing usage time of an IoT device which flexibly controls a standby mode of an IoT device according to a user's selection, and which enables a user to select an operation method of a standby mode by using an application for minimizing power consumption of an IoT device, and an apparatus therefor.

According to an aspect of the disclosure, an apparatus for managing usage time of an IoT device which includes a data receiver that receives mode setting information from an external server, a period determination part that determines a busy period or an idle period based on the mode setting information, a mode change information generator that generates change information of a receiving mode of an IoT device according to the busy period or the idle period, a mode controller that controls the receiving mode based on the change information of the receiving mode, and memory storing the mode setting information is provided.

According to another aspect of the disclosure, a method for managing usage time of an IoT device including a data receiving process of receiving mode setting information from an external server, a period determining process of determining a busy period or an idle period based on the mode setting information, a mode change information generating process of generating change information of a receiving mode of an IoT device according to the busy period or the idle period, a mode controlling process of controlling the receiving mode based on the change information of the receiving mode, and a process of storing the mode setting information is provided.

As described above, according to the disclosure, there is an effect of providing a method for managing usage time of an IoT device which flexibly controls a standby mode of an IoT device according to a user's selection, and which enables a user to select an operation method of a standby mode by using an application for minimizing power consumption of an IoT device, and an apparatus therefor.

Also, according to the disclosure, there is an effect of increasing a usage amount of a battery of an IoT device by using near field wireless communication including Wi-Fi.

In addition, according to the disclosure, there is an effect of improving the problem of a low power standby mode of an IoT device that the success rate of communication declines, by using an application according to a user's manipulation or instruction.

DESCRIPTION OF SPECIFIC EMBODIMENTS OF THE INVENTION

Hereinafter, the disclosure will be described in detail with reference to the accompanying drawings.

Hereinafter, the disclosure will be described in detail with reference to the accompanying drawings. In describing the components of this invention, terms such as the 'first,' 'the second,' etc. may be used. These terms are only for distinguishing one component from another component, and are not intended to limit the essence, order, or sequence of the component.

Also, in this specification, the term 'include' or 'comprise' should be construed as designating that there are such components, characteristics, steps or a combination thereof in the specification, but not to exclude the possibility of existence of one or more of components, other characteristics, steps or a combination thereof in advance. In addition, the description in the disclosure that one element is 'connected to,' 'coupled with/to' or 'in contact with' another element should be interpreted to include both the case where the one element is directly connected to or in contact with the another element, and the case where the one element is 'connected to,' 'coupled with/to' or 'in contact with' the another element through still another element.

Figure 1:
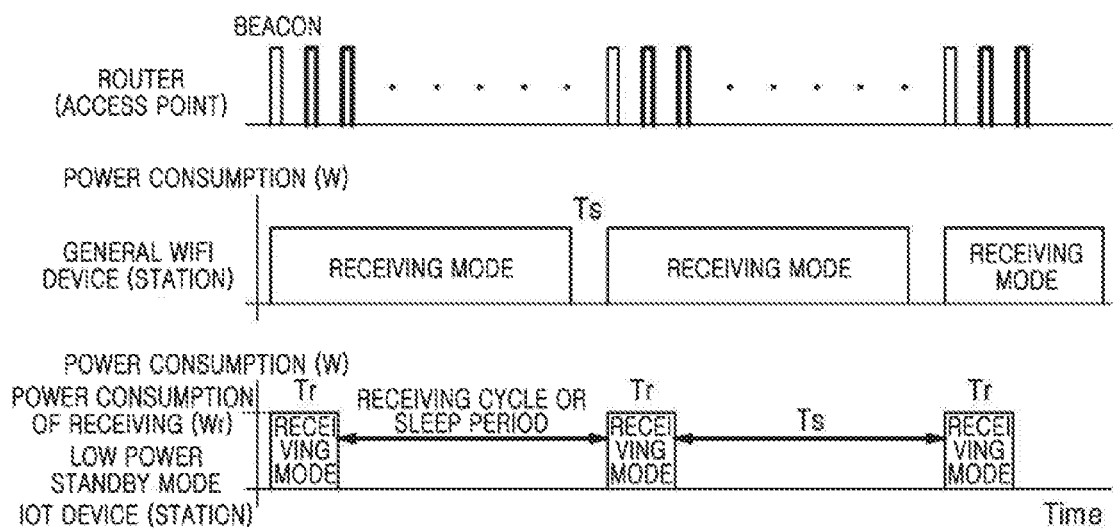
FIG. 1 is an exemplary diagram for illustrating a method of implementing a low power standby mode of a conventional IoT device.

FIG. 1 is an exemplary diagram for illustrating a method of implementing a low power standby mode of a conventional IoT device.

Referring to FIG. 1, a method of implementing a low power standby mode of a conventional IoT device can be identified. A router (AP: Access Point) 240 transmits a beacon signal including a control message for controlling an IoT device from a user terminal 210 to an IoT device. Meanwhile, a general Wi-Fi station device operates a receiving mode for receiving a beacon signal. However, in this case, the amount of power consumption increases, which is not appropriate for an IoT device that needs to use a battery. Accordingly, a general IoT device may set a low power standby mode.

For a low power standby mode, a technology of lengthening a sleep period Ts, and maintaining a receipt period Tr to be short is used, for increasing a usage amount of a battery. However, it is difficult to lengthen a sleep period, due to the characteristics of a chip and the router 240, etc. Meanwhile, an application for IoT devices has a function of turning on and off (On-Off) a standby mode of an IoT device, but the application cannot support a function like selective adjustment of a standby mode of an IoT device based on the frequency, strength, etc. of a beacon signal.

Figure 2:
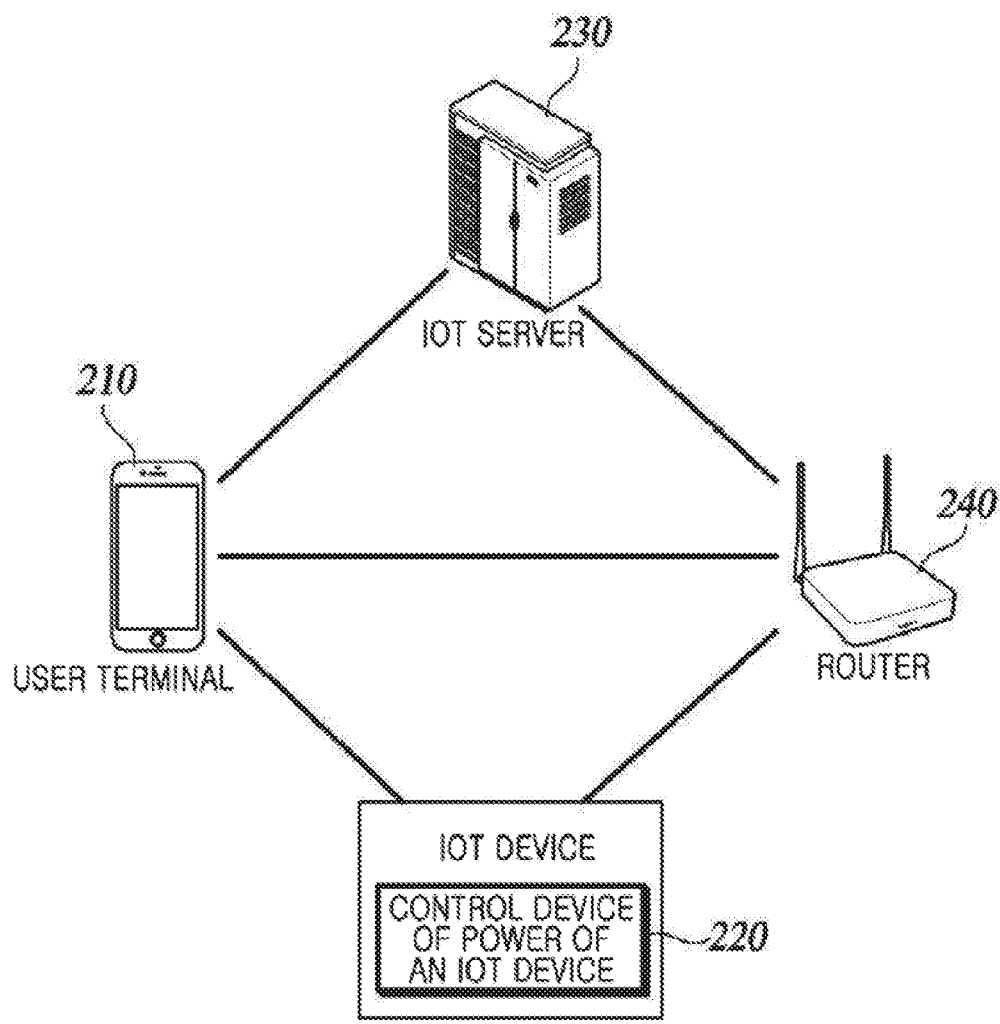
FIG. 2 is an exemplary diagram schematically illustrating a power control system of an IoT device according to an embodiment of the disclosure.

FIG. 2 is an exemplary diagram schematically illustrating a power control system of an IoT device according to an embodiment of the disclosure.

Referring to FIG. 2, a power control system of an IoT device according to an embodiment of the disclosure includes a user terminal 210, an apparatus for managing usage time of an IoT device 220, an IoT server 230, and a router 240. However, components included in a power control system of an IoT device are not necessarily limited thereto.

The user terminal 210 performs support such that an IoT device and the IoT server 230 are converted to a registration mode by using an application. The user terminal 210 transmits information of the router 240 connected through wireless communication to the IoT device. Here, information of the router means data including information including a Service Set Identifier (SSID) and a password, and it may also be a multicast packet including a multicast address.

The user terminal 210 transmits mode setting information for controlling an operation mode of the IoT device to the IoT server 230. Also, the user terminal 210 performs support such that the IoT device operates in an adaptive control mode by using an application.

The user terminal 210 may be an electronic apparatus such as a smart phone, a tablet, a laptop, a personal computer (PC), a personal digital assistant (PDA), a wireless communication terminal, a media player, a voice recognition speaker, etc. Also, the user terminal 210 includes a web browser for connecting to the IoT server 230 or the IoT device, memory for storing a program, a microprocessor for performing operation and control by executing a program, etc.

The apparatus for managing usage time of an IoT device 220 communicates with the IoT server 230 when it receives an instruction to proceed with an IoT registration procedure from the user terminal 210, and the mode of the apparatus is set as a registration mode. Also, the apparatus for managing usage time of an IoT device 220 receives information of the router from the user terminal 210, and performs a registration procedure while interworking with the IoT server 230 based on this.

In addition, the apparatus for managing usage time of an IoT device 220 receives mode setting information from the IoT server 230. Here, the mode setting information includes time information of a busy period, time information of an idle period, and time information of a non-use period, which is information for setting a receiving mode of the IoT device. The mode setting information will be described later with reference to FIG. 4.

Further, the apparatus for managing usage time of an IoT device 220 determines whether a sleep period is a busy period or an idle period based on the received mode setting information. Here, a sleep period means a time interval between the receiving modes of the IoT device. A busy period means a period where a sleep period is short, and an idle period means a period where a sleep period is long.

Also, the apparatus for managing usage time of an IoT device 220 generates change information of a receiving mode of the IoT device according to a busy period or an idle period, and controls the receiving mode of the IoT device based on the generated change information of the receiving mode. The configuration of the apparatus for managing usage time of an IoT device 220 will be described later with reference to FIG. 3.

Meanwhile, the apparatus for managing usage time of an IoT device 220 according to another embodiment of the disclosure may set an all-time connection period (ACP) by a user's manipulation or instruction. The apparatus for managing usage time of an IoT device 220 provides a real-time function regarding change of a status of an IoT device and monitoring using Wi-Fi to a user in an all-time connection period.

Also, the apparatus for managing usage time of an IoT device 220 according to another embodiment of the disclosure may set a unidirectional connection period (ECP) by a user's manipulation or instruction. The apparatus for managing usage time of an IoT device 220 provides a function of enabling communication when a physical control is generated in an IoT device in a unidirectional connection period. Meanwhile, in a unidirectional connection period, the mode is changed to a long time sleep mode for reducing power consumption of an IoT device.

Meanwhile, the apparatus for managing usage time of an IoT device 220 is illustrated as an apparatus installed inside an IoT device. However, the disclosure is not necessarily limited thereto, and the apparatus may be implemented in the form of an independent communication module.

The IoT server 230 is connected to the user terminal 210 and an IoT device based on a network using the router 240. To be more specific, the IoT server 230 is connected with an IoT device through a wireless communication network, and when the server receives an instruction to proceed with an IoT registration procedure from the user terminal 210, the mode of the server is set as a registration mode while the server interworks with the IoT device, and the server performs a registration procedure. Also, the IoT server 230 receives mode setting information from the user terminal 210, and transmits the information to the IoT device.

Meanwhile, a network refers to a network that is capable of transmitting and receiving data based on an Internet protocol by using various kinds of wire/wireless communication technologies such as an Internet network, an intranet, a mobile communication network, a satellite communication network, etc. A network as described above is a concept that not only refers to a closed network such as a local area network (LAN), a wide area network (WAN), etc. and an open network such as Internet, but also a network such as a code division multiple access (CDMA), a wideband code division multiple access (WCDMA), a global system for mobile communications (GSM), long term evolution (LTE), an evolved packet core (EPC), 5G, etc., and a next generation network to be implemented in the future, and a cloud computing network.

The router 240 is connected with the user terminal 210 through near field wireless communication, and provides a service set identifier and a password to the user terminal 210. Also, the router 240 receives mode setting information from the user terminal 210, and transmits the information to an IoT device. In addition, the router 240 transmits a beacon signal including a control message for controlling an IoT device to an IoT device.

Figure 3:
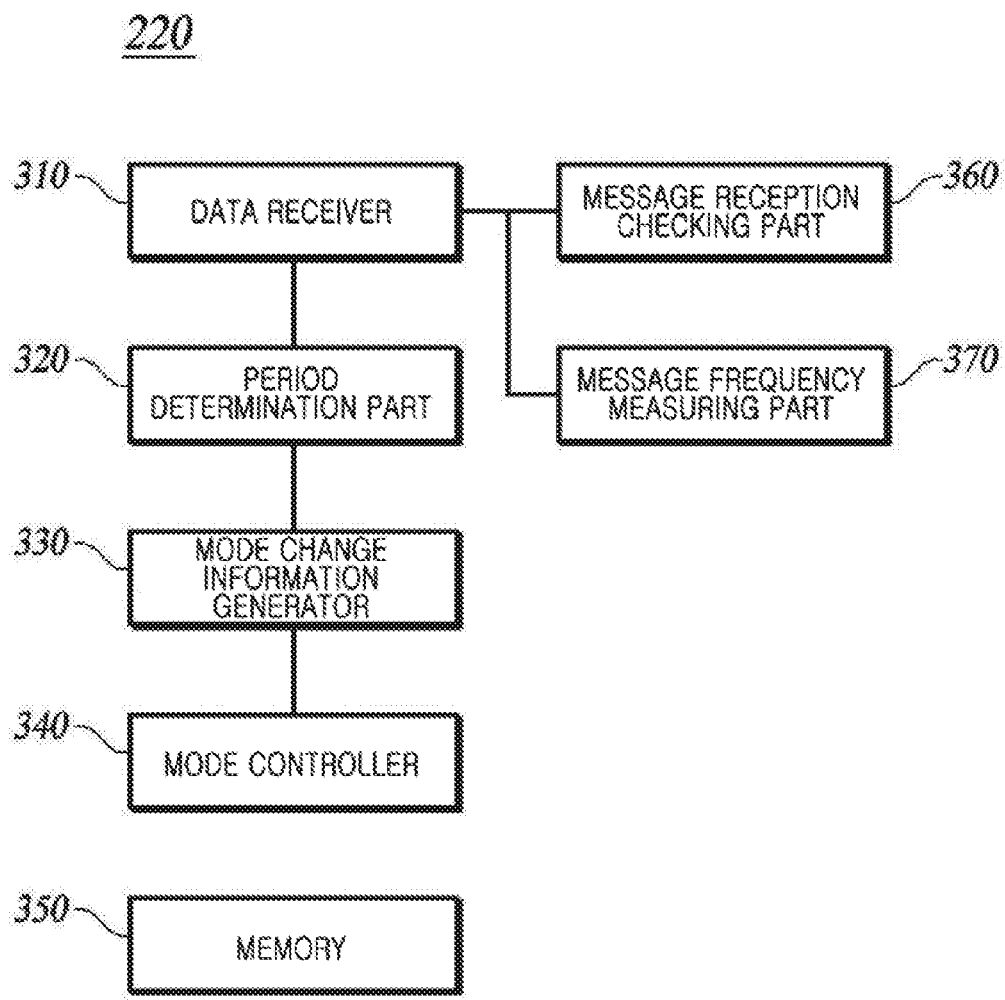
FIG. 3 is a block configuration diagram illustrating a configuration of an apparatus for managing usage time of an IoT device according to an embodiment of the disclosure.

FIG. 3 is a block configuration diagram illustrating a configuration of an apparatus for managing usage time of an IoT device according to an embodiment of the disclosure.

Referring to FIG. 3, the apparatus for managing usage time of an IoT device 220 according to an embodiment of the disclosure includes a data receiver 310, a period determination part 320, a mode change information generator 330, memory 350, a message reception checking part 360, and a message frequency measuring part 370. However, components included in the apparatus for managing usage time of an IoT device 220 are not necessarily limited thereto.

The data receiver 310 receives mode setting information from an external server. The data receiver 310 may be a kind of communication module for receiving mode setting information from the IoT server 230 or receiving a beacon signal from the router 240 by using wireless communication. The external server means the IoT server 230, but is not necessarily limited thereto.

Also, the data receiver 310 receives a control message for controlling an IoT device. The control message is generated from the user terminal 210 according to a user's manipulation or instruction, and is transmitted to the data receiver 310 while being included in the signal of the router 240.

The period determination part 320 determines a busy period or an idle period based on the received mode setting information. To be more specific, the period determination part 320 determines a sleep period corresponding to time information of a busy period as a busy period, and a sleep period corresponding to time information of an idle period as an idle period, based on time information of a busy period or time information of an idle period in the mode setting information input by a user.

Also, the period determination part 320 determines a busy period or an idle period by determining whether mode setting information is equal to or greater than a predetermined threshold. For example, in case the period determination part 320 receives only simple time information wherein time information of a busy period and time information of an idle period are not distinguished, the period determination part 320 may determine a period as a busy period if time information is smaller than 10 when a predetermined threshold is 10, and determine a period as an idle period if time information is equal to or greater than 10.

Further, the period determination part 320 may determine a busy period or an idle period based on a receiving frequency of a beacon signal stored in the memory 350. Also, the period determination part 320 may determine the type of a period by using message frequency information generated at the message frequency measuring part 370. That is, the period determination part 320 may determine the type of a sleep period in a specific time period of the next day by using message frequency information stored in the memory. For example, in case the period determination part 320 determines a time period of from 2 p.m. to 3 p.m. as a busy period, the period determination part 320 may determine a time period of from 2 p.m. to 3 p.m. of the next day as a busy period, based on message frequency information stored in the memory 350.

In addition, the period determination part 320 checks a user's usage frequency through the IoT server 230, and stores a status of periodic operations such that a busy period or an idle period can be determined based on a signal transmitted from the IoT server 230.

Meanwhile, in case the data receiver 310 does not receive a control message for a specific time period, the period determination part 320 determines a period corresponding to the time period when a control message is not received as a non-use period, and transmits time information of the non-use period, which is time information with respect to the non-use period, to the mode controller 340.

The mode change information generator 330 generates change information of the receiving mode of the IoT device according to a busy period or an idle period determined at the period determination part 320. Meanwhile, in case the period determination part 320 determines a sleep period as a non-use period, the mode change information generator 330 does not generate change information of the receiving mode. Here, change information of the receiving mode means information of control that operates a receiving mode of the IoT device for a specific number of times for a specific time period.

The mode controller 340 controls the receiving mode of the IoT device based on the generated change information of the receiving mode. Meanwhile, in case the data receiver 310 does not receive a control message for a specific time period or receives time information of a non-use period, the mode controller 340 sets the mode of the IoT device as a minimum current mode. Meanwhile, the mode controller 340 controls a receiving mode based on change information of a receiving mode, but it is also possible that a user controls a receiving mode by manipulating the IoT device directly.

The memory 350 stores various kinds of information necessary for controlling the IoT device, such as mode setting information, message frequency information, etc. Also, the memory 350 is capable of memorizing data for a long term even in a state where supply of electricity is shut off, and a memory device which is capable of erasing and writing recorded data may be replaced with any kinds of memory devices.

The message reception checking part 360 checks whether a control message for controlling the IoT device has been received at the data receiver 310 based on a control signal received from the router 240. In case the data receiver 310 does not receive a control signal within a predetermined period, the message reception checking part 360 determines that the power of the router 240 has been shut off, or a communication error occurred, and transmits information of an instruction that makes the IoT device operate in a minimum current mode to the mode controller 340.

The message frequency measuring part 370 measures a receiving frequency of a control message for a specific time period, and generates message frequency information. Then, the message frequency measuring part 370 transmits the generated message frequency information to the memory 350. The message frequency information may be used when determining the type of a sleep period.

Figure 4:
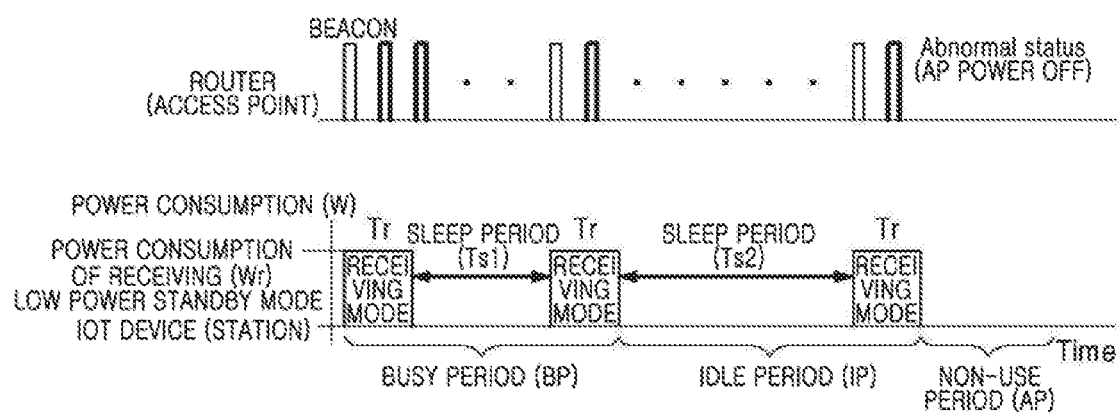
FIG. 4 is an exemplary diagram for illustrating an operation of an apparatus for managing usage time of an IoT device according to an embodiment of the disclosure.

FIG. 4 is an exemplary diagram for illustrating an operation of an apparatus for managing usage time of an IoT device according to an embodiment of the disclosure.

Referring to FIG. 4, the IoT device receives a beacon signal from the router 240. In the case of a time period when a user's control frequency is high, the IoT device receives a control message transmitted from the user terminal 210 in a short cycle, and thus the IoT device receives a beacon signal more often than usual in a short cycle. Accordingly, the apparatus for managing usage time of an IoT device 220 according to an embodiment of the disclosure may implement an adaptive (selective) standby mode of the IoT device by selectively setting a time period when a control frequency is high as a busy period, and setting a time period when a control frequency is low as an idle period.

The apparatus for managing usage time of an IoT device 220 determines a busy period or an idle period, and implements a selective standby mode based on the determination. Also, in case a beacon signal is not received from the router 240, the apparatus for managing usage time of an IoT device 220 determines the status as an abnormal status. Here, an abnormal status means a case wherein the power of the router 240 has been turned off, or a beacon signal cannot be received due to defective communication. In addition, the apparatus for managing usage time of an IoT device 220 defines a period corresponding to an abnormal status as a non-use period, and does not operate the receiving mode of the IoT device during the non-use period, but makes the IoT device operate in a minimum current mode.

Figure 5A:
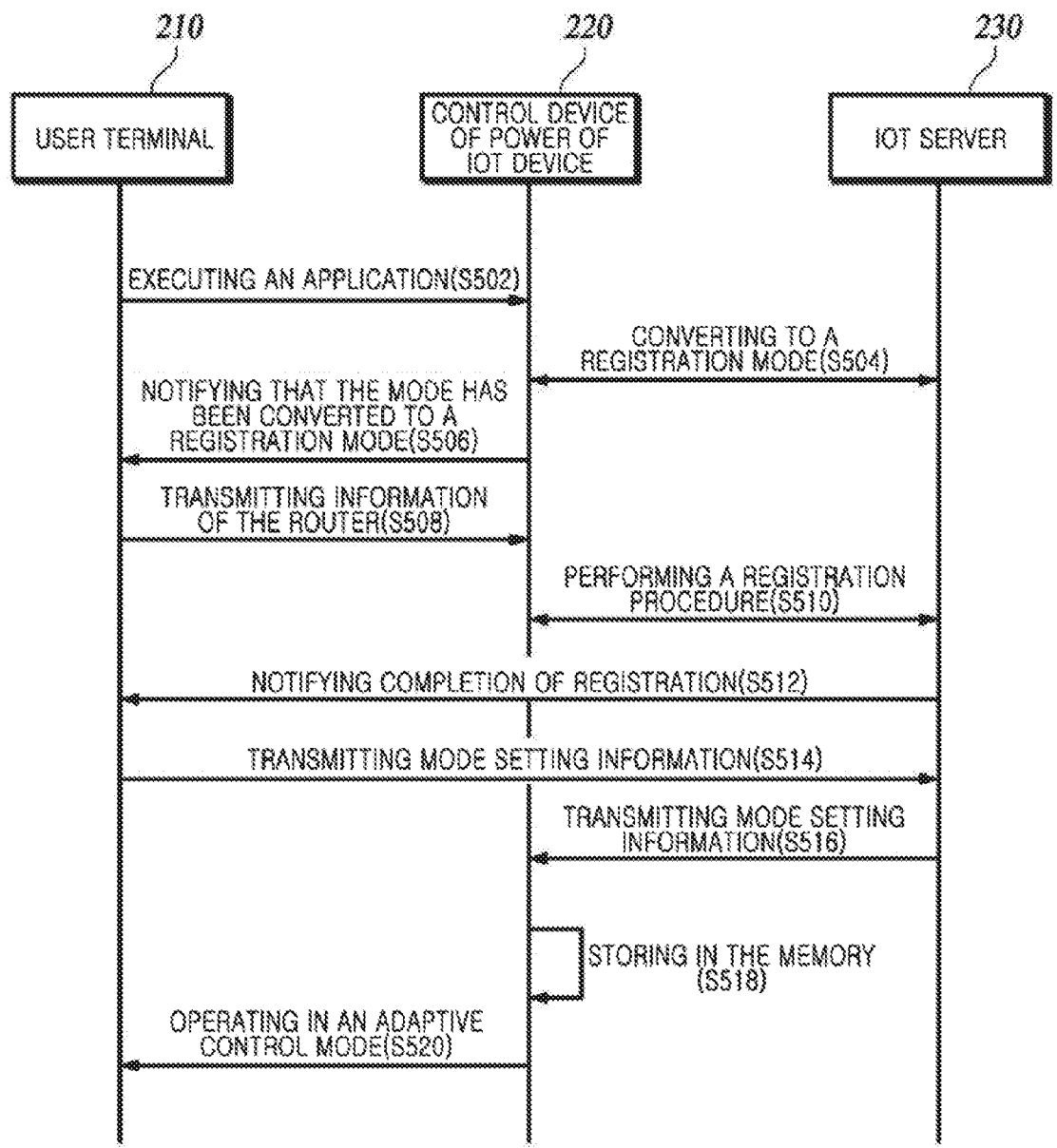
FIG. 5A is a flow chart schematically illustrating a registration process of an IoT server and a management process of usage time of an IoT device.

FIG. 5A is a flow chart schematically illustrating a registration process of an IoT server and a control process of power of an IoT device.

Referring to FIG. 5A, the apparatus for managing usage time of an IoT device 220 first performs a process of registering an IoT device to the IoT server 230.

The user terminal 210 executes an application, and becomes interworked with the apparatus for managing usage time of an IoT device 220 at operation S502. The apparatus for managing usage time of an IoT device 220 becomes interworked with the IoT server 230 based on wireless communication, and the mode of the apparatus is converted to a registration mode at operation S504. Then, the apparatus for managing usage time of an IoT device 220 notifies to the user terminal 210 that its mode has been converted to a registration mode at operation S506. In addition, the apparatus for managing usage time of an IoT device 220 transmits information of the router connected through near field wireless communication to the apparatus for managing usage time of an IoT device 220 at operation S508. Then, the apparatus for managing usage time of an IoT device 220 becomes interworked with the IoT server 230, and performs an IoT registration procedure to the IoT server 230 at operation S510. When the IoT registration procedure is completed, the IoT server 230 notifies to the user terminal 210 that registration has been completed at operation S512.

When the registration procedure is completed, the user terminal 210 transmits mode setting information to the IoT server 230 at operation S514. At operation S514, the user terminal 210 may include time information for setting an all-time connection period or a unidirectional connection period according to a user's manipulation or instruction in the mode setting information, and transmit the information. The IoT server 230 transmits the received mode setting information to the apparatus for managing usage time of an IoT device 220 at operation S516. Then, the apparatus for managing usage time of an IoT device 220 stores the received mode setting information in the internal memory 350 at operation S518. Also, the apparatus for managing usage time of an IoT device 220 operates in an adaptive (selective) control mode based on the mode setting information, as described earlier with respect to FIGS. 3 and 4 at operation S520. At operation S520, in case the apparatus for managing usage time of an IoT device 220 received time information of an all-time connection period or a unidirectional connection period at operation S514, the apparatus operates in an all-time connection mode or a unidirectional connection mode.

Figure 5B:
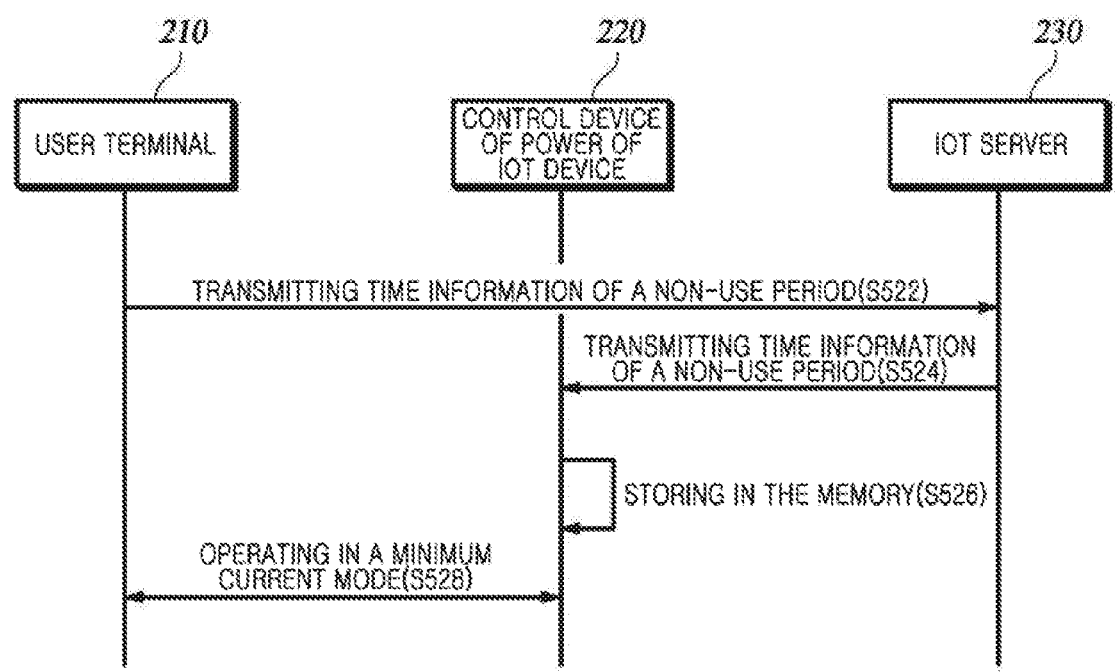
FIG. 5B is a flow chart schematically illustrating a process wherein an IoT device operates in a minimum current mode.

FIG. 5B is a flow chart schematically illustrating a process wherein an IoT device operates in a minimum current mode.

Referring to FIG. 5B, the apparatus for managing usage time of an IoT device 220 according to an embodiment of the disclosure completes operations S502 to S512 in FIG. 5A, and transmits time information of a non-use period to the IoT server 230 at operation S522. The IoT server 230 transmits the received time information of the non-use period to the apparatus for managing usage time of an IoT device 220 at operation S524. The apparatus for managing usage time of an IoT device 220 stores the received time information of the non-use period in the memory 350 at operation S526. Then, the apparatus for managing usage time of an IoT device 220 operates in a minimum current mode at operation S528.

FIGS. 5A and 5B describe that operations S502 to S520, and S522 to S528 are sequentially executed. However, the disclosure is not necessarily limited thereto. In other words, application may be made such that the operations described in FIGS. 5A and 5B are executed while being changed, or one or more operations are executed in parallel. Thus, FIGS. 5A and 5B are not limited to a time-series order.

Figure 6:
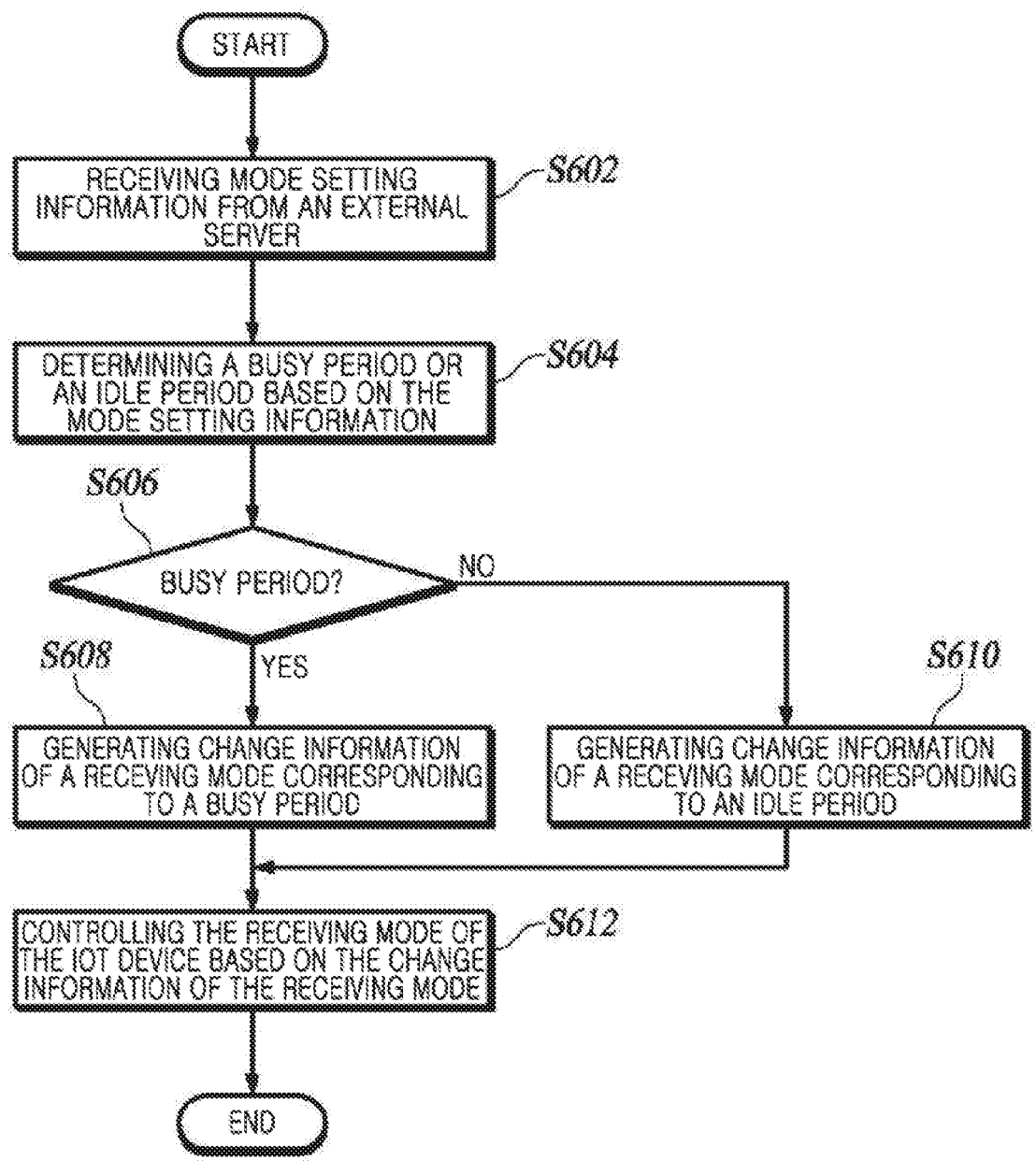
FIG. 6 is a sequence diagram for illustrating a method for managing usage time of an IoT device according to an embodiment of the disclosure.

FIG. 6 is a sequence diagram for illustrating a method for managing usage time of an IoT device according to an embodiment of the disclosure.

Referring to FIG. 6, the apparatus for managing usage time of an IoT device 220 according to an embodiment of the disclosure receives mode setting information from an external server, i.e., the IoT server 230 at operation S602.

The apparatus for managing usage time of an IoT device 220 determines a busy period or an idle period based on the received mode setting information at operation S604. At operation S604, the apparatus for managing usage time of an IoT device 220 may set the type of a sleep period by a user's direct manipulation or instruction for the IoT device.

Also, in case the sleep period is determined as a busy period at operation S606, the apparatus for managing usage time of an IoT device 220 generates change information of a receiving mode corresponding to the busy period at operation S608.

Meanwhile, in case the sleep period is not determined as a busy period at operation S606, the apparatus for managing usage time of an IoT device 220 determines that the period is an idle period, and generates change information of a receiving mode corresponding to the idle period at operation S610. At operation S610, in case the apparatus for managing usage time of an IoT device 220 receives time information of a non-use period or does not receive a beacon signal for a specific time period, the apparatus may determine the sleep period as a non-use period.

The apparatus for managing usage time of an IoT device 220 controls a receiving mode of the IoT device based on change information of the receiving mode at operation S608 or operation S612, at operation S612.

FIG. 6 describes that operations S602 to S612 are sequentially executed. However, the disclosure is not necessarily limited thereto. In other words, application may be made such that the operations described in FIG. 6 are executed while being changed, or one or more operations are executed in parallel. Thus, FIG. 6 is not limited to a time-series order.

Figure 7:
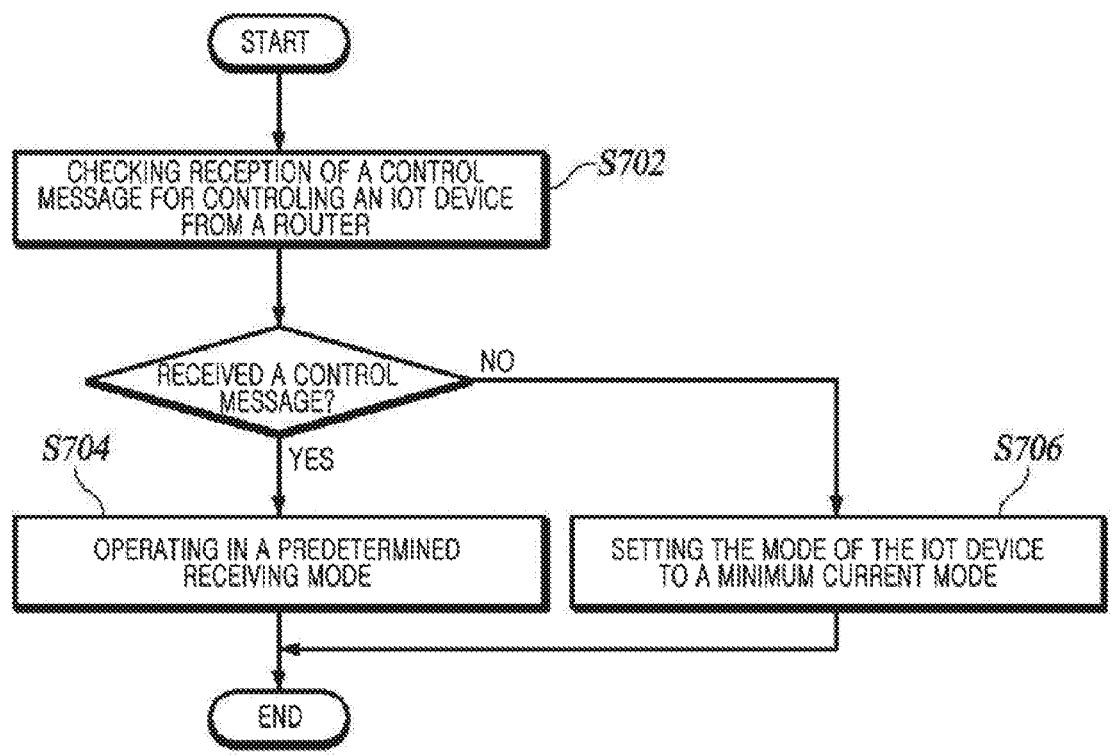
FIG. 7 is a sequence diagram for illustrating a method by which an apparatus for managing usage time of an IoT device according to an embodiment of the disclosure sets an operation mode of an IoT device according to whether a control message has been received.

FIG. 7 is a sequence diagram for illustrating a method by which an apparatus for managing usage time of an IoT device according to an embodiment of the disclosure sets an operation mode of an IoT device according to whether a control message has been received.

Referring to FIG. 7, the apparatus for managing usage time of an IoT device 220 according to an embodiment of the disclosure receives a beacon signal from the router 240. Also, the apparatus for managing usage time of an IoT device 220 checks whether a control message included in a control signal transmitted from the router has been received at operation S702. In case a control message has been received, the apparatus for managing usage time of an IoT device 220 continuously operates in a predetermined receiving mode at operation S704.

Meanwhile, in case a beacon signal is not received from the router 240 for a specific time period, the apparatus for managing usage time of an IoT device 220 sets the IoT device in a minimum current mode at operation S706. At operation S706, the apparatus for managing usage time of an IoT device 220 may set a minimum current mode based on time information of a non-use period, as described earlier.

The descriptions above are merely exemplary embodiments of the technical idea of the disclosure, and it is apparent that various modifications and variations can be made by those having ordinary skill in the technical field to which the disclosure belongs, without departing from the gist of the disclosure. Accordingly, the embodiments described above are not for limiting the technical idea of the disclosure, but for describing it, and the scope of the technical idea of the disclosure is not to be limited by the embodiments. In addition, the scope of protection of the disclosure is to be interpreted by the appended claims, and all technical ideas within the same scope are to be interpreted to be included in the scope of protection of the disclosure.

DESCRIPTION OF REFERENCE NUMERALS

210: USER TERMINAL
220: APPARATUS FOR MANAGING USAGE TIME OF AN IOT DEVICE
230: IOT SERVER
240: ROUTER
310: DATA RECEIVER
320: PERIOD DETERMINATION UNIT
330: MODE CHANGE INFORMATION GENERATOR
340: MODE CONTROLLER
350: MEMORY
360: MESSAGE RECEPTION CHECKING PART
370: MESSAGE FREQUENCY MEASURING PART

What is claimed is:

1. An apparatus for managing usage time of an internet of things (IoT) device comprising a memory and a processor, wherein a program containing computerized instructions is stored in the memory and configured to be executed by the processor to perform a method, the method comprising:

receiving mode setting information from an external server;
determining whether a sleep period is a busy period or an idle period based on the mode setting information;
generating change information of a receiving mode of an IoT device according to the busy period or the idle period;
controlling the receiving mode based on the change information of the receiving mode; and
storing the mode setting information,
wherein the controlling the receiving mode comprising:
controlling an interval between times, at which the IoT device operates the receiving mode to receive a beacon signal, to be shorter than a predetermined threshold in response to determining that the sleep period is the busy period; and
controlling an interval between times, at which the IoT device operates the receiving mode to receive a beacon signal, to be equal to or longer than the predetermined threshold in response to determining that the sleep period is the idle period.

2. The apparatus for managing usage time of an IoT device according to claim 1, wherein the method further comprising:
checking whether a control message for controlling the IoT device has been received based on a control signal transmitted from a router; and
measuring a receiving frequency of the control message for a specific time period and generates message frequency information.

3. The apparatus for managing usage time of an IoT device according to claim 2, wherein the determining comprising:
determining the busy period or the idle period based on time information of the busy period or time information of the idle period included in the mode setting information.

4. The apparatus for managing usage time of an IoT device according to claim 3, wherein the determining comprising:
in response to receiving the mode setting information including only simple time information, determining the busy period or the idle period by comparing the predetermined threshold with the simple time information.

5. The apparatus for managing usage time of an IoT device according to claim 4, wherein the determining comprising:
determining the busy period or the idle period based on the message frequency information.

6. The apparatus for managing usage time of an IoT device according to claim 1, wherein the mode setting information includes time information of a busy period, time information of an idle period, time information of a non-use period, time information of an all-time connection period, and time information of a unidirectional connection period.

7. A method for managing usage time of an internet of things (IoT) device comprising:
a data receiving process of receiving mode setting information from an external server;
a period determining process of determining a busy period or an idle period based on the mode setting information;
a mode change information generating process of generating change information of a receiving mode of an IoT device according to the busy period or the idle period;

a mode controlling process of controlling the receiving mode based on the change information of the receiving mode; and a process of storing the mode setting information wherein the mode controlling process comprising:

a process of controlling an interval between times, at which the IoT device operates the receiving mode to receive a beacon signal, to be shorter than a predetermined threshold in response to determining that the sleep period is the busy period, and a process of controlling the interval between times, at which the IoT device operates the receiving mode to receive a beacon signal, to be equal to or longer than the predetermined threshold in response to determining that the sleep period is the idle period.

* * * * *